(12) United States Patent
Cartwright, Jr. et al.

(10) Patent No.: US 6,223,335 B1
(45) Date of Patent: Apr. 24, 2001

(54) PLATFORM INDEPENDENT DOUBLE COMPARE AND SWAP OPERATION

(75) Inventors: Robert S. Cartwright, Jr., Houston, TX (US); Ole Agesen, Franklin, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/207,940

(22) Filed: Dec. 9, 1998

(51) Int. Cl.$^7$ ......................................................... G06F 9/45
(52) U.S. Cl. .................................. 717/1; 711/150; 717/5
(58) Field of Search ................................. 717/1, 2, 5, 7, 717/8, 9; 712/14, 217; 711/150, 152, 154, 155; 709/104, 106, 107

(56) References Cited

U.S. PATENT DOCUMENTS

| | | | |
|---|---|---|---|
| 5,093,912 | * 3/1992 | Dong et al. ........................... | 709/104 |
| 5,579,505 | * 11/1996 | Ohkami ................................ | 711/155 |
| 5,613,139 | * 3/1997 | Brady .................................... | 710/200 |
| 5,742,785 | * 4/1998 | Stone et al. ........................... | 712/217 |
| 5,893,157 | * 4/1999 | Greenspan et al. .................. | 711/150 |
| 5,937,199 | * 8/1999 | Temple ................................. | 711/152 |
| 5,968,160 | * 10/1999 | Saito et al. ............................. | 712/14 |
| 5,983,015 | * 11/1999 | Lee et al. .............................. | 395/677 |
| 5,991,845 | * 11/1999 | Bohannon et al. ................... | 710/200 |
| 6,128,710 | * 10/2000 | Greenspan et al. .................. | 711/152 |

OTHER PUBLICATIONS

Valois, "Lock–free linked lists using Compare–and–Swap", PODC 95, ACM, 1995, pp. 214–222.*

Herlihy, "Wait–free synchronization", ACM Transaction on Programming LAnguages and systems, ACM, Jan. 1991, pp 124–149.* et al., Simple, fast and practical non–blocking and blocking concurrent queue algorithm, PODC '96, ACM, 1996, pp 267–275.*

(List continued on next page.)

Primary Examiner—Kakali Chaki
(74) Attorney, Agent, or Firm—Weingarten, Schurgin, Gagnebin & Hayes LLP

(57) ABSTRACT

A system for providing a double compare and swap operation is disclosed. In the disclosed system, a first single compare and swap operation is performed. If a contents of a first variable is equal to an old value for the first variable, then the first compare and swap operation writes a value to the first variable indicating that the variable is not accessible and indicates success. A second single compare and swap operation is executed in the event that the first single compare and swap operation indicates success. If a contents of a second variable is equal to an old value for the second variable, then the second single compare and swap operation writes a new value for the second variable into the second variable and indicates success. If the second single compare and swap operation indicates success, a new value for the first variable is written to the first variable. Reads and writes on the first variable are prevented while the first variable contains the value indicating that the variable is inaccessible. The disclosed double compare and swap operation writes the old value for the first variable into the first variable if the second single compare and swap operation fails.

32 Claims, 10 Drawing Sheets

OTHER PUBLICATIONS

Technical Report No. CUCS–005–91; *A Lock–Free Multiprocessor OS Kernel*, Henry Massalin and Calton Pu, Department of Computer Science, Columbia University, New York, NY 10027, Revised Jun. 19, 1991.

"Software Transactional Memory" by Nir Shavit and Dan Touitou Software Transactional Memory Distributed Computing, Special Issue, 10 (1997), pp. 99–116.

"The Synergy Between Non–blocking Synchronization and Operating System Structure" by Michael Greenwald and David Cheriton–Computer Science Dept., Stanford University.

"A Methodology for Implementing Highly Concurrent Data Objects" by Maurice Herlihy ACM Transactions on Programming Languages and Systems, vol. 15, No. 5, Nov. 1993, pp. 745–770.

*The Synergy Between Non–blocking Synchronization and Operating System Structure*; Michael Greenwald and David Cheriton, Computer Science Department, Stanford University, Stanford, CA.

\* cited by examiner

```
T:
   Void M₁ ( ) {
        INT  i = 5;
        OBJECT  r = null;
        . . .
        M₂ ( i );
   }
                                           } 82

INT M₂ ( INT n) {
        n = n+1;
        return  r * r + 5;
   }
                                           } 84

80
```

PLATFORM INDEPENDENT DOUBLE COMPARE AND SWAP OPERATION

CROSS REFERENCE TO RELATED APPLICATIONS

None

STATEMENT REGARDING FEDERALLY SPONSORED RESEARCH OR DEVELOPMENT

Not Applicable

BACKGROUND

The disclosed system relates generally to synchronization mechanisms for concurrently executing computer programs, and more specifically to a system for providing an efficient, platform independent double compare and swap operation.

In contemporary computer systems, there is a desire for software programs to execute using multiple "threads", which each perform a specific sequential set of activities. Such "multi-threading" is for example desirable to take advantage of computer systems having multiple CPU's, by permitting concurrent execution of different threads on different CPU's. Multi-threading to provide concurrent execution using multiple CPU's may be obtained using threads defined either explicitly by a programmer or in an automated fashion by a software tool such as a compiler.

Dividing a program into multiple threads may also be useful where the resulting code is executed on a single processor system. Programmers often find that the problems they are asked to solve involve sets of activities that can be performed independently by decomposing the general problem into multiple threads. Accordingly, multi-threading is also considered to be an important programming tool.

For concurrently executing threads to operate correctly on shared data, a mechanism or protocol must be provided that ensures exclusive access to the shared data for the duration of an indivisible operation. Such an indivisible operation is known as an "atomic" operation which provides "mutual exclusion" with respect to accessing the shared data.

Various types of software locks have been developed to provide mutual exclusion. Existing software locks typically allow a thread wishing to access shared data to request a lock associated with the data. If the thread successfully obtains the lock, it is guaranteed exclusive access to the data until it explicitly releases the lock. No thread may access the shared data unless it holds the associated lock.

Existing software locks generally rely on an instruction of the underlying hardware which indivisibly tests and modifies a "lock word" of memory associated with the shared data. If a thread attempts to obtain a lock for data that is already locked, the lock request may either loop indefinitely testing the lock word ("busy waiting"), or alternatively suspend execution until it detects a signal generated by an "unlock" instruction issued by the thread holding the lock.

When many threads frequently try to access the same data, existing software lock mechanisms may become a bottleneck because only one thread can make progress at a time. Moreover, significant computational resources can be consumed managing a pool of waiting threads.

Some concurrent programs can be written to directly utilize certain indivisible hardware instructions in order to ensure data synchronization without using software locks. This approach to data synchronization is known as "wait-free" synchronization. With this approach the software is advantageously designed so that execution of threads can be arbitrarily interleaved without adversely affecting the computation. However, the effectiveness of this approach depends on the power of the specific indivisible operations provided by the underlying hardware.

An example of an existing hardware implemented instruction that can be used to support synchronization of concurrent threads is the "compare-and-swap" instruction (CAS). The CAS instruction atomically compares the contents of a memory location with a test value and stores a new value into the location if there is a match. Unfortunately, it is awkward to write programs using CAS, because it only updates one location indivisibly. Many useful algorithms require larger indivisible operations than CAS. For example, it is difficult to insert a node in a doubly-linked list using CAS because two pointers must be updated in a single atomic operation.

A few existing hardware processors have implemented a "double-compare-and-swap" operation (DCAS). A DCAS instruction atomically compares the contents of two separate locations against test values, and if both contents match the test values, replaces the contents of the locations with new values. DCAS is more useful that CAS in certain applications because it can indivisibly express many more data structure operations. It is highly valuable for computer programs to be developed or generated such that they are platform independent, in that they may be executed without modification on a variety of hardware platforms. Because the DCAS hardware instruction is not universally implemented, programs which depend on DCAS to provide synchronization must today be modified to execute on systems which only provide CAS. Such modification may be prohibitively expensive to implement. While certain software simulations of DCAS have been proposed, these proposals have typically been based on conventional software locks. Accordingly the power of the DCAS instruction is practically unavailable to existing programs which are required to be platform independent.

For the reasons stated above, it would be desirable to have a system which provides an efficient, platform independent DCAS operation. Such a new system would provide a powerful tool for synchronizing concurrent threads of execution and for improving overall system performance.

SUMMARY

Consistent with the present invention, a technique for providing a double compare and swap operation is disclosed. In the disclosed technique, a first single compare and swap operation is performed. If a contents of a first variable is equal to an old value for the first variable, then the first compare and swap operation writes a value to the first variable indicating that the variable is not accessible and indicates success. An indication of success, as used herein, provides information external to an operation indicating that the operation has successfully completed.

A second single compare and swap operation is executed in the event that the first single compare and swap operation indicates success. If a contents of a second variable is equal to an old value for the second variable, then the second single compare and swap operation writes a new value to the second variable and indicates success. If the second single compare and swap operation indicates success, a new value is written to the first variable. Reads and writes on the first variable are prevented while the first variable contains the value indicating that it is inaccessible, for example through use of a read/write barrier.

In an exemplary embodiment, the disclosed double compare and swap operation fails if the contents of the first variable is not equal to the old value for the first variable, and provides a failure indication as a result. An indication of failure, as used herein, provides information external to an operation indicating that the operation has failed to complete successfully. Further in this embodiment, the second single compare and swap operation fails if the contents of the second variable does not equal the old value for the second variable, thereby failing the double compare and swap operation. In a further exemplary embodiment, the disclosed double compare and swap operation writes the old value for the first variable into the first variable if the second single compare and swap operation fails.

Also in an exemplary embodiment, the first variable is required to hold a word-aligned address. The first variable may furthermore be required to be of a predetermined kind, for example of the volatile type. In this embodiment, accesses to variables of the predetermined kind are prevented when such variables contain the value indicating that the variable is inaccessible.

Thus there is disclosed a system which provides an efficient, platform independent DCAS operation. The disclosed system provides a powerful tool for synchronizing concurrent threads of execution and for improving overall system performance.

BRIEF DESCRIPTION OF THE DRAWINGS

The invention will be more fully understood by reference to the following detailed description of the preferred embodiments in conjunction with the drawings of which.

DETAILED DESCRIPTION OF THE PREFERRED EMBODIMENTS

Figure 1:
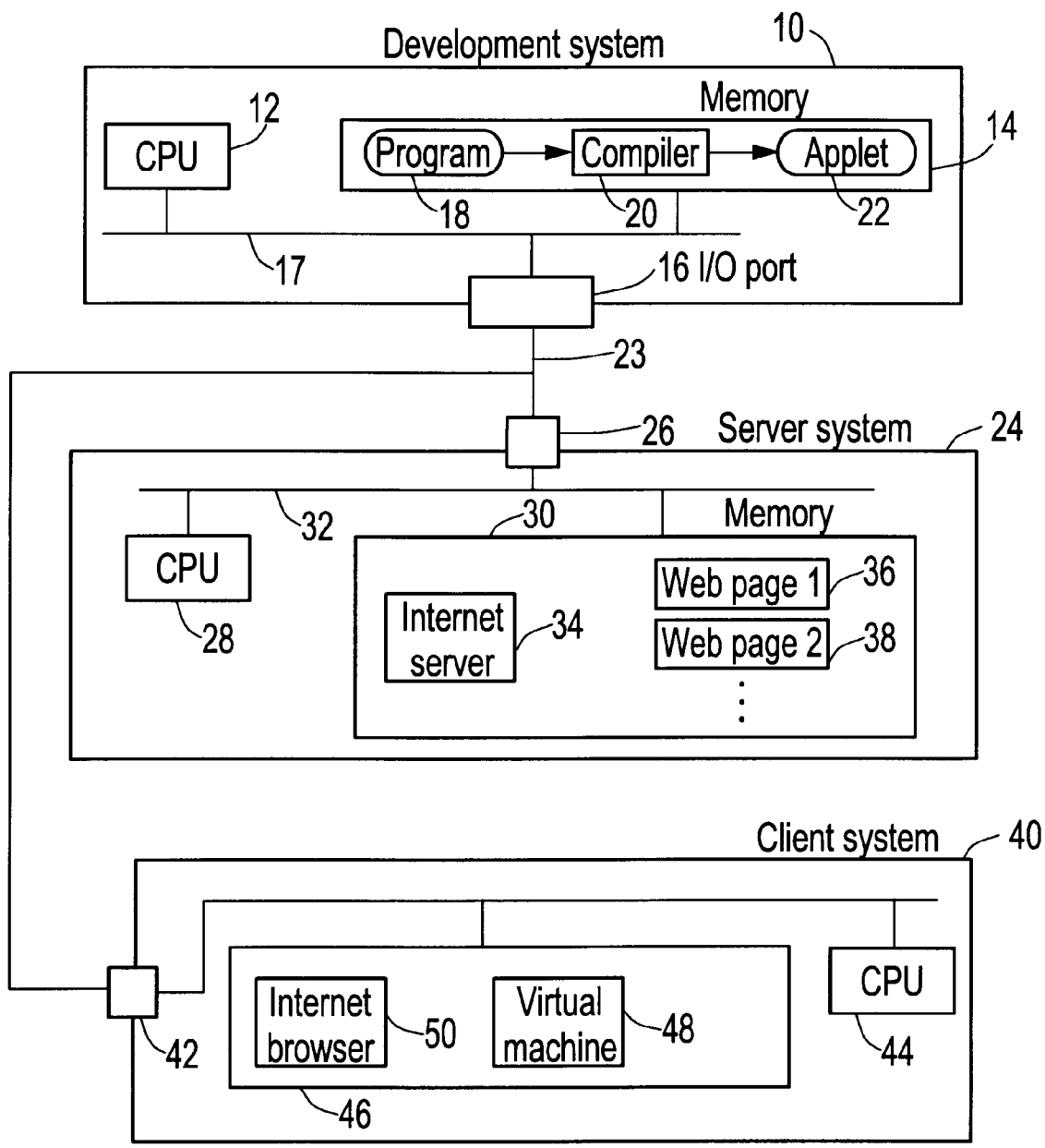
FIG. 1 is a block diagram showing an example environment in which the disclosed system operates.

Consistent with the present invention, a system for providing a double compare and swap operation is disclosed. An environment in which the disclosed double compare and swap operation may be embodied is shown in FIG. 1. Specifically, FIG. 1 shows a number of elements including a development system 10 having a CPU 12, which is coupled to a memory 14 and an I/O port 16. The I/O port 16 is for example connected to the Internet. The memory 14 is shown including a program 18, a compiler 20 and an applet 22.

A server system 24 is shown including a CPU 28 coupled to a memory 30 and an I/O port 26. The I/O port 26 is for example connected to the Internet. The memory 30 is shown including an Internet server software program 34 as well as web pages 36 and 38. A client system 40 is shown including a CPU 44 coupled with a memory 46 and a I/O port 42. The I/O port 42 is for example connected to the Internet. The memory 46 is shown including an Internet browser software program 50 and a virtual machine software program 48.

During operation of the elements shown in FIG. 1, the program 18 is processed by the compiler 20 to produce one or more byte code programs. An example of such a byte code program is applet 22. In an example embodiment the applet 22 consists of byte codes generated in response to a program written in the JAVA(TM) programming language as defined by Sun Microsystems. In an alternative embodiment, the applet 22 is a byte code program resulting from processing another high level computer language such as C++ or other object-oriented languages.

Further during operation of the elements shown in FIG. 1, the applet 22 is stored into one or more of the web pages 36 or 38. The web pages 36 and 38 may be downloaded onto the client system 40 under control of the Internet browser 50, through the Internet server 34. After being downloaded onto the client system 40, the applet 22 may be executed on the virtual machine 48. Byte codes within the applet 22 are processed as instructions within the virtual machine 48, in order to display or otherwise process aspects of the one or more web pages 36 or 38 in cooperation with the Internet browser 50.

While the embodiment of FIG. 1 shows the virtual machine 48 downloaded and executing in the memory 46 of the client system 40, many other configurations are possible. The virtual machine may also be executed remotely on another system, with results of such execution passed to the client system 40 via the I/O port 42. In addition, the virtual machine may be downloaded or executed from a computer program product, such as a CDROM or floppy disk, which includes or is in addition to the memory 46. Also, the virtual machine may be downloaded over a communications network by means of a communications signal received by the client system through I/O port 42.

Figures 2, 3:
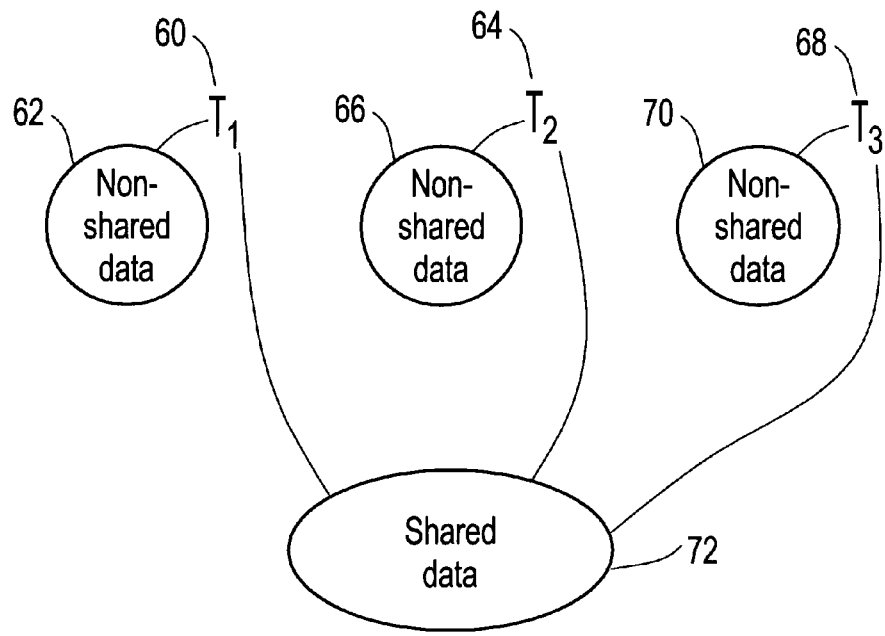
FIG. 2 is a block diagram showing threads with shared and non-shared data.
FIG. 3 is pseudocode showing an example of a thread including multiple methods having local variables.

FIG. 2 shows a logical representation of several threads, for example executing on the client system 40 of FIG. 1, together with shared and non-shared data. Specifically, FIG. 2 shows threads $T_1$ 60, $T_2$ 64, and $T_3$ 68 having shared and non-shared data. Non-shared data 62 is only accessible to thread $T_1$ 60, non-shared data 66 is only accessible to thread $T_2$ 66, and non-shared data 70 is only accessible to thread $T_3$ 68. Shared data 72 is accessible to any of threads $T_1$ 60, $T_2$ 64, or $T_3$ 68. Accordingly, accesses to shared data 72 must be synchronized among the various threads to preserve data integrity.

FIG. 3 shows pseudocode for a thread having multiple methods 82 and 84, but without shared data. In the illustrative embodiment of FIG. 3, local variables introduced within a method are only accessible within that method.

Specifically in the example of FIG. 3, the local variable r is an example of a reference type variable which can indicate an object of class "object". However, the value of r is encapsulated within method M1 82, and accordingly cannot be directly accessed by other methods. Similarly, parameters are passed using the call by value convention, such that the value of the local integer variable i in method M1 82 is not modified by the invocation of method M2 on the value stored in i. As will be shown below, an object that is referred to by r can, however, be accessed by other methods or threads.

Figure 4:
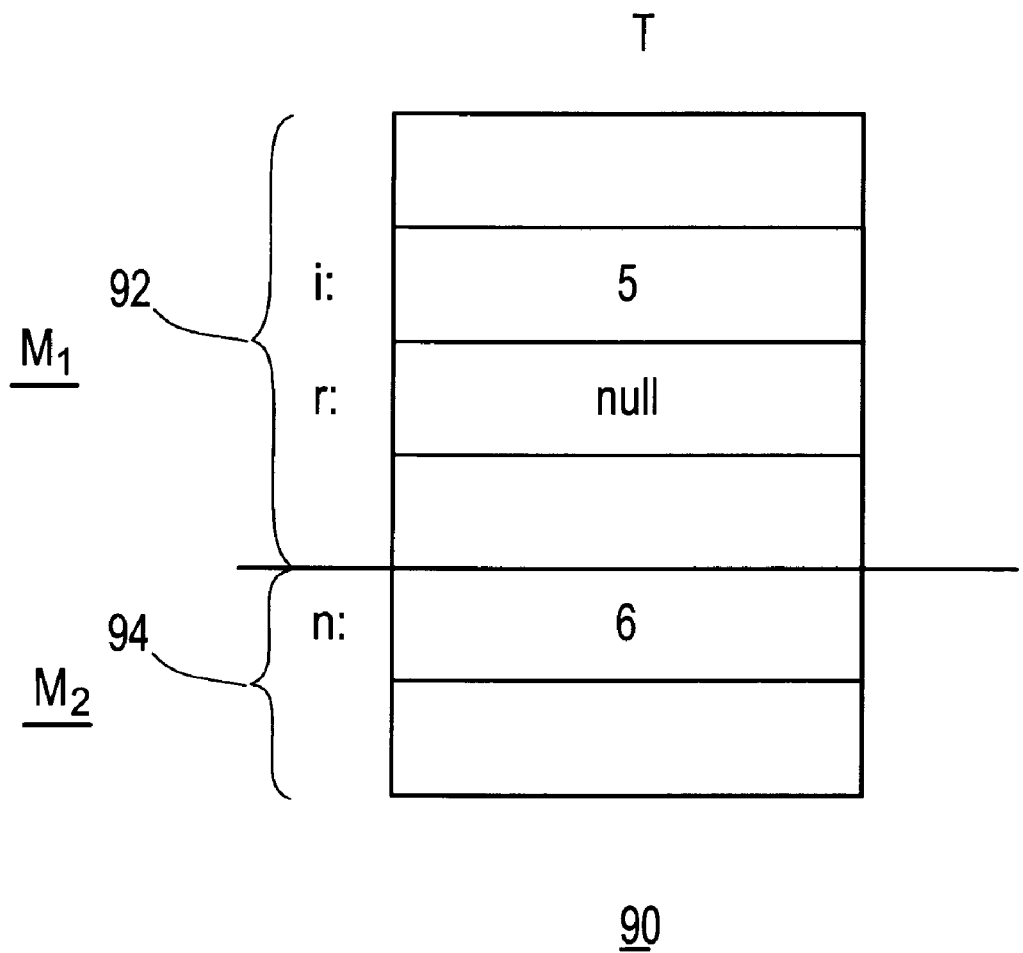
FIG. 4 is a block diagram showing an example of an execution stack representing the thread shown in FIG. 3.

FIG. 4 shows an execution stack corresponding to the pseudocode shown in FIG. 3, such as may be formed during execution of a program corresponding to the pseudocode on the virtual machine 48 as shown in FIG. 1. The strong data encapsulation of the example embodiment of FIGS. 3 and 4 implies that any shared must data reside in fields of objects referred to, directly or indirectly, from local variables. Objects including such shared data accordingly do not reside in the stack frame, but rather in an object heap.

While the strong data encapsulation of the example embodiment shown in FIGS. 3 and 4 is a characteristic of the JAVA programming environment, the applicability of the disclosed system is not limited to such an environment. In an alternative embodiment, the disclosed synchronization system may be employed in a programming environment providing relatively weak data encapsulation, such as that provided by C++ or other object-oriented languages.

Figure 5:
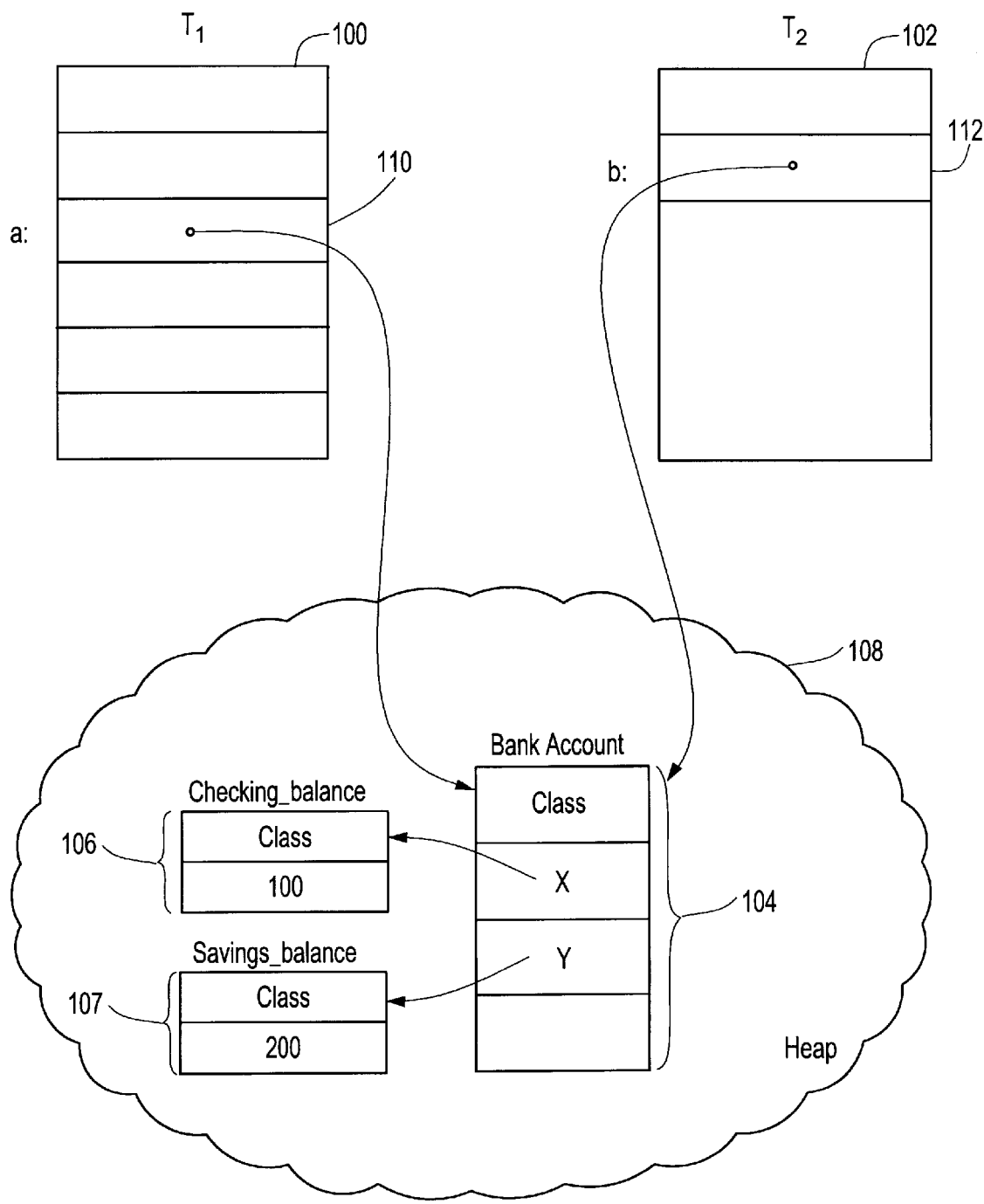
FIG. 5 is a block diagram showing an example of multiple threads sharing an object by local references to the shared object in their respective execution stacks.

FIG. 5 shows an embodiment of an object 104 of class BankAccount that is shared by threads $T_1$ 100 and $T_2$ 102. An example execution stack for thread $T_1$ 100 is shown including a local reference a 110 indicating the shared object 104. Thread $T_2$ 102 includes a local reference b referring to the shared object 104. The shared object 104 is shown for illustrative purposes including a reference variable x referring to a checking account balance object 106 and a reference variable y referring to a savings account balance object 107. The shared object 104 is shown stored in a block of memory 108 that is accessible to both thread T1 100 and thread $T_2$ 102, and which is referred to as the heap. In the example embodiment of FIG. 5, all objects are stored within the heap 108.

As depicted in FIG. 5, thread $T_1$ 100 operates on behalf of a first user of the bank account represented by the shared object 104, while thread $T_2$ 102 operates on behalf of a second user of the bank account. Accordingly, operations on the checking account balance object 106 and the savings account balance object 107, including transfers between the two accounts, must be synchronized between thread $T_1$ 100 and thread $T_2$ 102 to ensure correctness of the account balances. A synchronized modification of the two bank balances may be performed by swapping in new instances of the checking account balance object 106 and the savings account balance object 107. For example, the disclosed system writes new balances a into a new instance of checking account balance object 106 and a new instance of savings account balance object 107. The system then uses a double compare and swap operation as described below in order to modify the reference variables x and y to indicate the new instances (for example of a Balance class) containing the updated balances.

Figure 6:
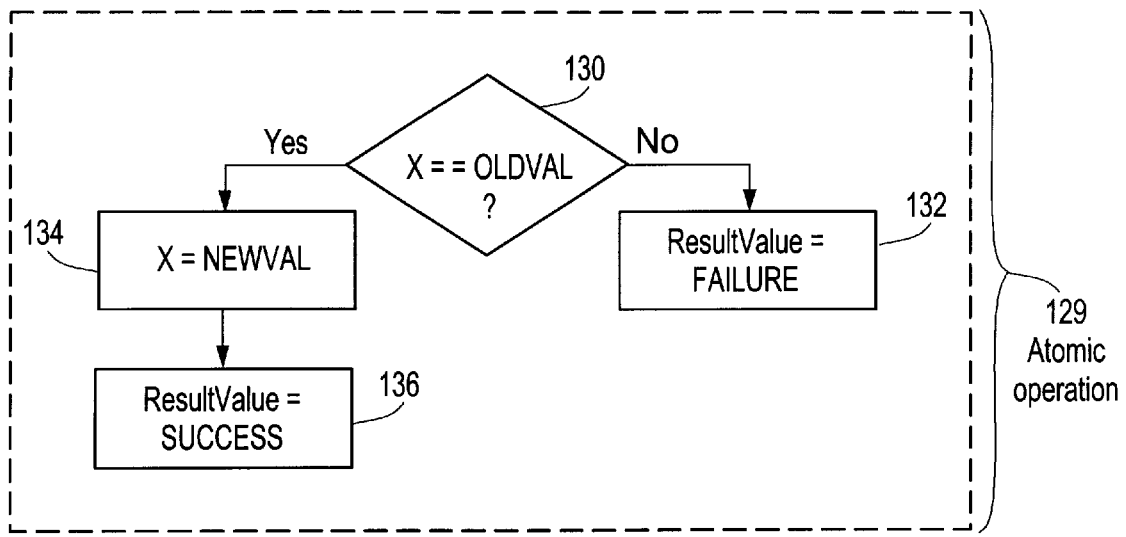
FIG. 6 is a flow chart showing an exemplary embodiment of a compare and swap operation.

FIG. 6 is a flow chart showing steps employed in one embodiment of a compare and swap operation. As shown in FIG. 6, the steps performed are part of a single, uninterruptable, atomic operation 129. At step 130, the contents of an input variable x is compared to an old value. If the contents of the variable x does not match the old value, step 130 is followed by step 132, in which a result value is set to indicate failure. Otherwise, at step 134 a new value is stored into the variable x and at step 136 the result value is set to indicate success.

Figure 7:
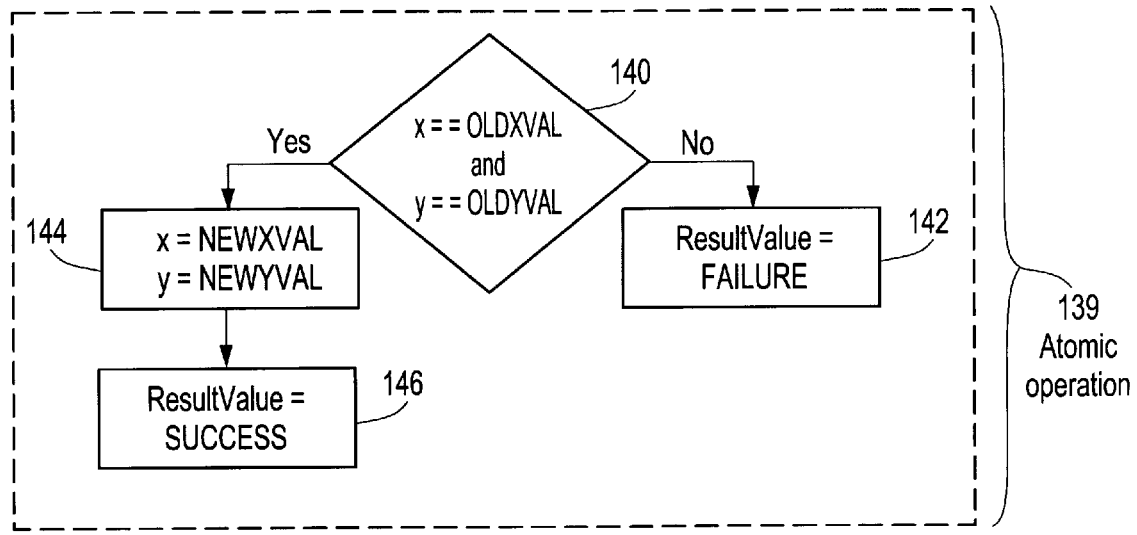
FIG. 7 is a flow chart showing an exemplary embodiment of a double compare and swap operation.

FIG. 7 is a flow chart showing steps performed during a double compare and swap operation. The steps in FIG. 7 are performed during a single, uninterruptable atomic operation 139. At step 140, the contents of a first variable x is compared with an old value for that variable, and the contents of a second variable y is also compared with a corresponding old value. If either of the variables x or y contain values that do not equal their respective old values, step 140 is followed by step 142, in which a result value is set to indicate failure. Otherwise, at step 144 new values are stored into the variables x and y. Following step 144, a result value is set to indicate success at step 146.

Figure 8:
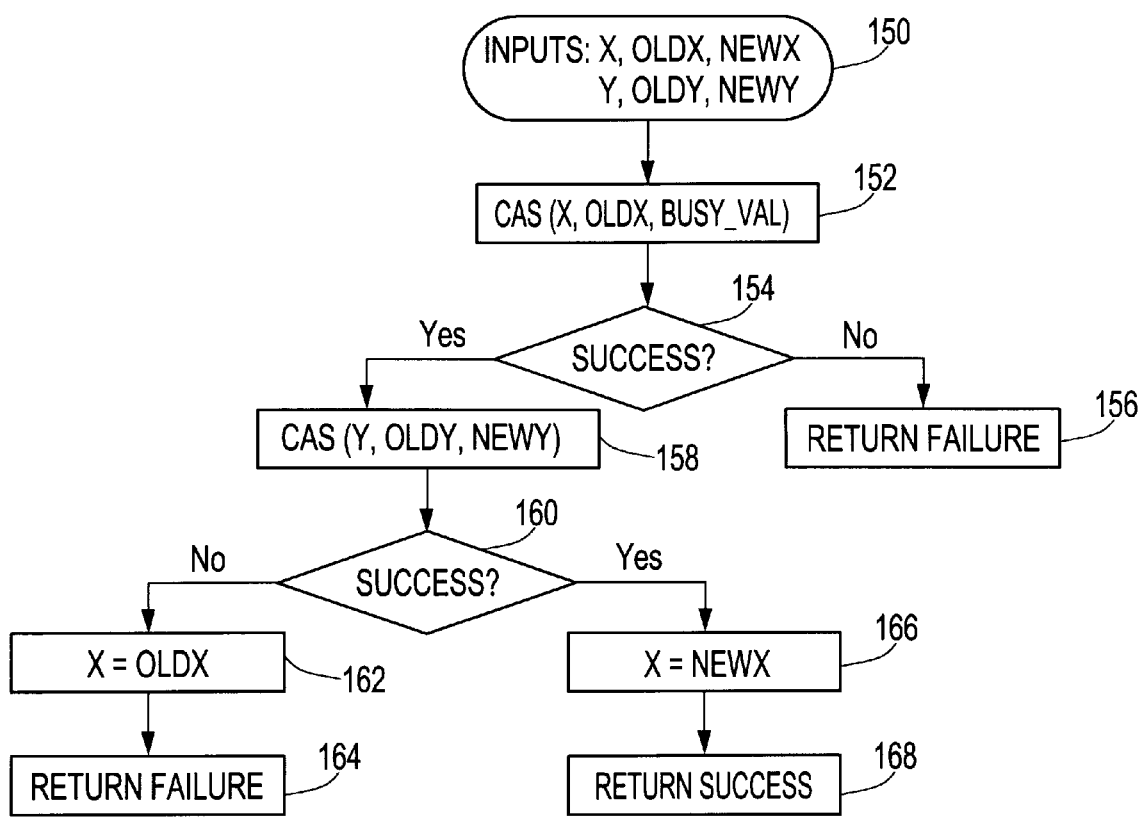
FIG. 8 is a flow chart consistent with the present invention of a double compare and swap operation including two compare and swap operations.

A double compare and swap operation consistent with the present invention is shown in FIG. 8. More specifically, FIG. 8 shows steps performed during a double compare and swap operation using two compare and swap operations. The two compare and swap operations of FIG. 8 may be performed directly on an underlying hardware system, for example by way of compare and swap hardware instructions.

At step 150, a variable x, an old x value, a new x value, and a variable y, together with an old y value and a new y value, are input. At step 152, a single compare and swap operation is performed in which the value of the variable x is compared with the old x value, and if there is a match, a value indicating that the variable x is inaccessible (a "busy value") is stored in the a variable x. The compare and swap operation then indicates success. If the value of the variable x does not equal the old x value, the single compare and swap operation indicates failure.

At step 154, it is determined whether the compare and swap operation of step 152 indicated success. If so, step 154 is followed by step 158. Otherwise step 154 is followed by step 156, wherein the double compare and swap operation returns a failure indication.

At step 158 a compare and swap operation is performed in which a value of the y variable is compared with the old value for y. If there is a match, a new value for the y variable is stored into the y variable, and the compare and swap operation of step 158 indicates success. Otherwise, the compare and swap operation of step 158 indicates failure.

At step 160 it is determined whether the compare and swap operation of step 158 indicated success. If not, step 160 is followed by step 162, in which the old value for x is stored into the x variable. Step 162 is followed by step 164, in which the double compare and swap operation returns a failure indication. If step 160 determines that the compare and swap operation of step 158 indicated success, then step 160 is followed by step 166, in which the new x value is stored into the x variable. Step 166 is followed by step 168, in which the double compare and swap operation returns a success indication.

In an embodiment for the JAVA programming language, the disclosed double compare and swap operation supports a conditional assignment expression having the following syntax:

[x with oldx, y with oldy]?=[newx, newy]

The conditional assignment syntax returns a boolean value indicating success or failure, and evaluates arguments in left-to-right order.

Figure 9:
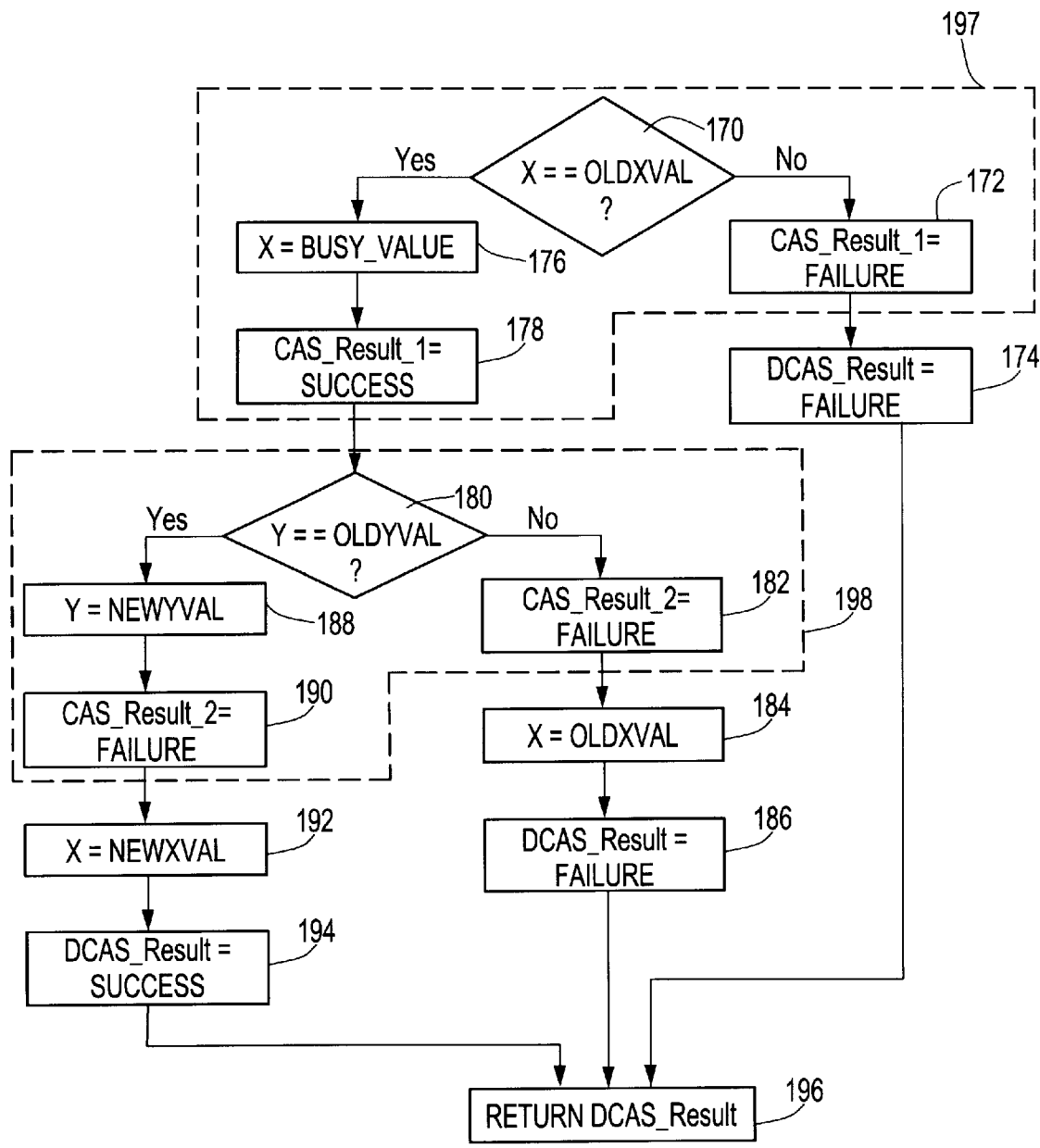
FIG. 9 is a flow chart showing in more detail the steps of FIG. 8, and in particular expanding the compare and swap operations steps of FIG. 8 consistent with the example embodiment of FIG. 6.

FIG. 9 shows a more detailed flow chart of steps performed in a double compare and swap operation consistent with the present invention. FIG. 9 includes a first set of steps 197 corresponding to a first atomic compare and swap operation. FIG. 9 further includes a second set of steps 198 corresponding to a second atomic compare and swap operation. At step 170, a value of a variable x is compared with an old value for the variable x. If the value of the variable x matches the old value for the variable x, step 170 is followed by step 176. Otherwise step 170 is followed by step 172.

At step 172, a result value for the first single compare and swap operation 197 is set to indicate failure. Step 172 is followed by step 174 in which a result value for the double compare and swap operation of FIG. 9 is set to indicate failure. Step 174 is followed by step 196.

At step 176, the variable x is set to a value indicating that the variable x is inaccessible (a "busy value"). Step 176 is followed by step 178, in which a result value for the first compare and swap operation 197 is set to indicate success. Step 178 is followed by step 180.

At step 180 a value of a variable y is compared to an old value for variable y. If the value of the variable y matches the old value for the variable y at step 180, step 180 is followed by step 188. Otherwise step 180 is followed by step 182, in which a result value for the second compare and swap operation 198 is set to indicate failure. Step 182 is followed by step 184, in which the value of the variable x is set to the old value for the variable x. Step 184 is followed by step 186, in which a result value for the double compare and swap operation of FIG. 9 is set to indicate failure. Step 186 is followed by step 196. At step 188, the value of variable y is set to a new value for the variable y. Step 188 is followed by step 190, in which a result value for the compare and swap operation 198 is set to indicate success. Step 190 is followed by step 192.

At step 192, the variable x is set to a new value for the variable x. Step 192 is followed by step 194 in which a result value for the double compare and swap operation of FIG. 9 is set to indicate success. Step 194 is followed by step 196, in which the result value for the double compare and swap operation of FIG. 9 is returned.

Figure 10:
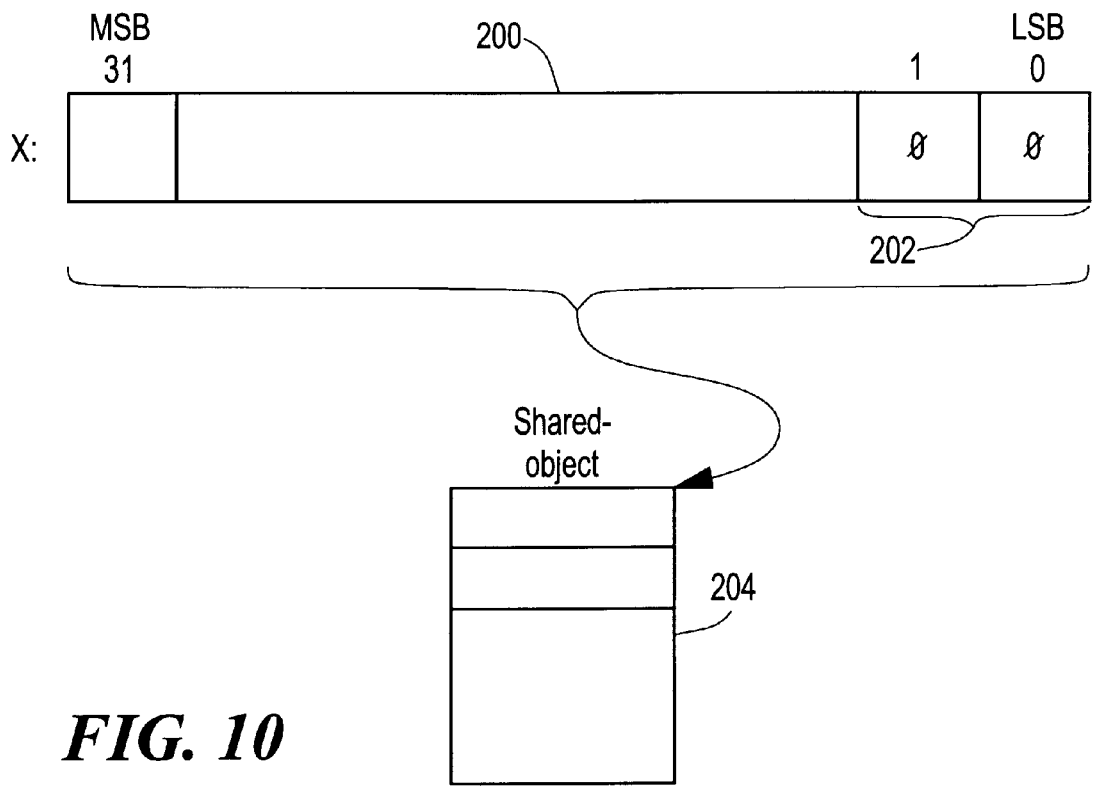
FIG. 10 is a block diagram showing an example embodiment of a reference to a word-aligned shared object.

FIG. 10 is a block diagram showing an embodiment of a reference variable 200 which indicates a word-aligned shared object. The reference variable 200 is an embodiment of the reference type variables x and y in the BankAccount shared object shown in FIG. 5. In the embodiment of FIG. 10, the shared objects 106 and 107 of FIG. 5 are defined to be word-aligned, and accordingly the reference variables x and y in the shared BankAccount object are ensured to contain word-aligned addresses. For example, the JAVA programming language may be employed tc provide this property in the reference variable x 200, since JAVA is a strongly typed and pointer safe language, thus ensuring that reference variables cannot ordinarily be used to store integer values.

In FIG. 10, a word-aligned shared object 204 is shown indicated by a reference variable x 200. The reference variable x 200 is shown having 32 bits beginning with a least significant bit (LSB) through a most significant bit (MSB), though other reference variable sizes may be substituted. In the embodiment of FIG. 10, as a result of the word alignment of instances of the shared object 204, the reference variable x includes two low order bits 202 whose value is ordinarily zero. The number of low order bits 202 whose value is ordinarily zero in the reference variable x is dependent on the degree of alignment of the shared object 204. While in the example embodiment of FIG. 10, the shared object 204 is word-aligned, if the shared object 204 were for example aligned to larger memory segment size, for example a double word or quad word, the number of bits 202 whose value is ordinarily zero would accordingly be greater.

During the disclosed double compare and swap operation, a bit pattern is written into the reference variable x 200 to indicate that the that the reference variable x 200 is inaccessible to reads or writes. Such a bit pattern is referred to as a "busy value". The busy value is a value that could not ordinarily be used in the reference variable x 200. In an example embodiment, the busy value includes a non-zero value in the bits 202. By writing the busy value into the reference variable x 200, the present system provides a read/write barrier preventing access to the reference variable x 200 until a new value, different from the busy value, is written to the reference variable x 200.

Figure 11:
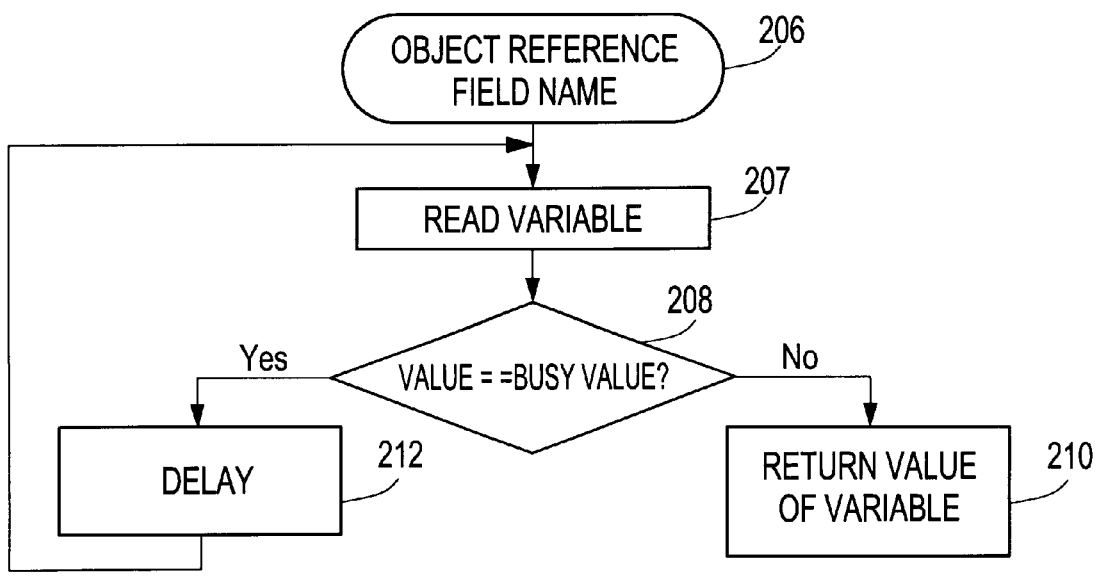
FIG. 11 is a flow chart showing steps performed in an exemplary read barrier during an attempt to read a variable which may hold a busy value.

FIG. 11 is a flow chart showing steps performed during an attempt to read a variable which may hold the busy value. At step 206, an indication of a variable which may hold the busy value is received. Such indication is also referred to as the variable name. In the example of FIG. 11, the variable name is provide( as a reference to an object in combination with a name of a field within that object. At step 207, the value held by the variable i read. At step 208, the value held by the variable is compared with the busy value. If the value held by the variable is equal to the busy value, then step 208 is followed by step 212. At step 212, the thread delays for some time period, and then goes back to step 207.

If the value held by the variable is not equal to the busy value, then step 208 is followed by step 210. At step 210, the system returns the value that was read from the variable in step 207.

Figure 12:
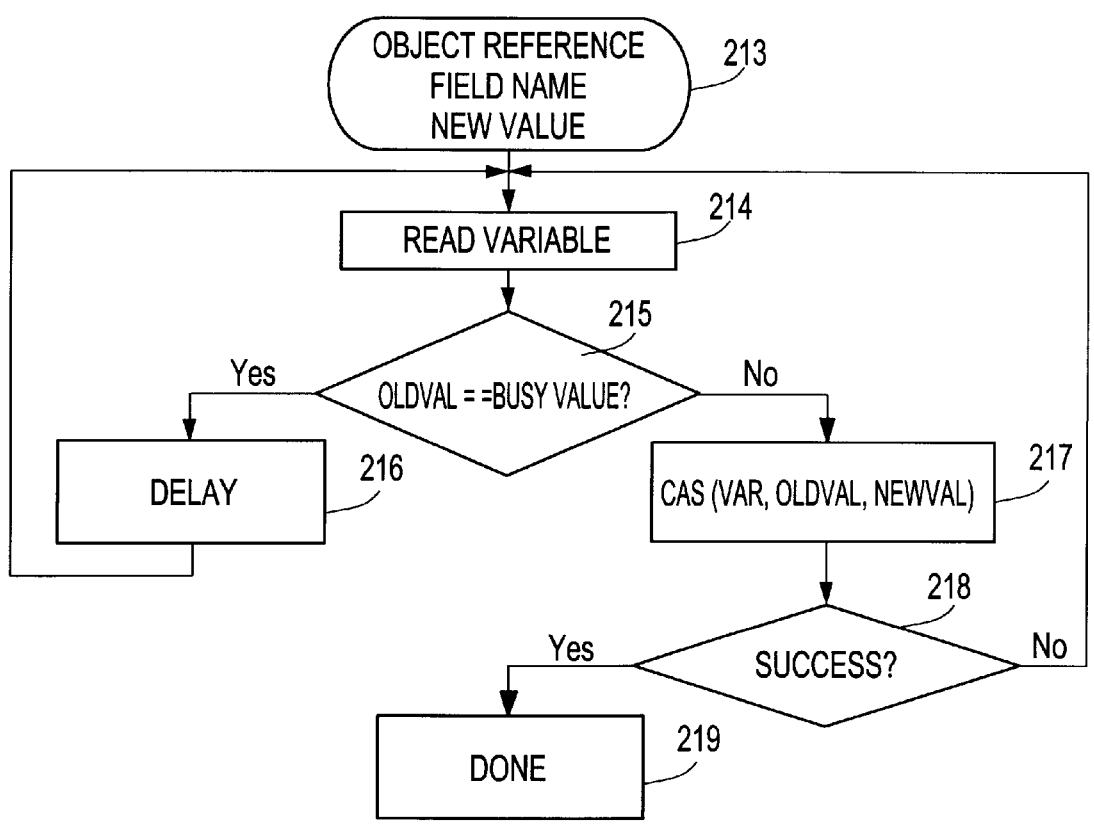
FIG. 12 is a flow chart showing steps performed in an exemplary write barrier during an attempt to write a variable which may hold a busy value.

FIG. 12 is a flow chart showing steps performed during an attempt to write a variable which may hold the busy value. At step 213, an indication of a variable which may hold the busy value is received, as well as a new value to be written to the variable. Such indication is also referred to as the variable name. In the example of FIG. 12, the variable name is provided as a reference to an object in combination with a name of a field within that object. At step 214, the value held by the variable is read. At step 215, the value read from the variable is compared with the busy value. If the value held by the variable is equal to the busy value, then step 215 is followed by step 216. At step 216, the system delays for some time period, and then goes back to step 214.

If the value held by the variable is not equal to the busy value, then step 215 is followed by step 217. At step 217, the system performs a compare and swap operation on the variable, using the value of the variable read at step 214 as the old value, and the new value input at step 213 as the new value. At step 218 the system determines whether the compare and swap operation of step 217 completed successfully. If so, step 218 is followed by step 219, and the write operation is done. Otherwise, step 218 is followed by step 214.

The read/write barrier described with reference to FIGS. 11 and 12 may be strictly enforced when embodied in connection with e language which is fundamentally type safe, such as Java. II contrast with languages which are not type safe, such as C++, a Java implementation strictly enforces a requirement that all data elements can only be accessed using operations that are permitted on their data type. Accordingly, if variables which may hold the busy value are required to be of a particular type, then that type may be selected or defined such that no operation is permitted on the variables of that type without going through the read/write barrier. Accordingly, by virtue of the strong type system in such an embodiment, the compiler may be utilized to effectively prevent all operations which could compromise the integrity of the DCAS implementation.

While the read/write barrier of the disclosed system is not non-blocking, it may be considered to be nearly non-blocking. Specifically, though a thread invoking the double compare and swap operation will never block, there is a small possibility that it may be preempted, for example by a scheduler, while the busy value is preventing access to a reference variable. In that case, there is a further possibility that a second thread will be scheduled that will attempt to access the reference variable storing the busy value. In this situation, the second thread may be blocked. However, such a scenerio is relatively unlikely. Moreover, several techniques may be employed to cooperate with the scheduler to prevent such an occurrance. In a first technique, the thread state includes a bit which indicates "do not time slice this thread for the next K instructions". Such a bit can be set prior to executing step 152 in FIG. 8 and left set until the busy value is replaced by a non-busy value. Another technique is available where the scheduler performs a call-back to a thread before it preempts that thread. In this case a thread that is in the process of performing a DCAS can restore the old value of that variable when it receives such a call-back, to prevent being preempted while the variable holds the busy value.

Figure 14:
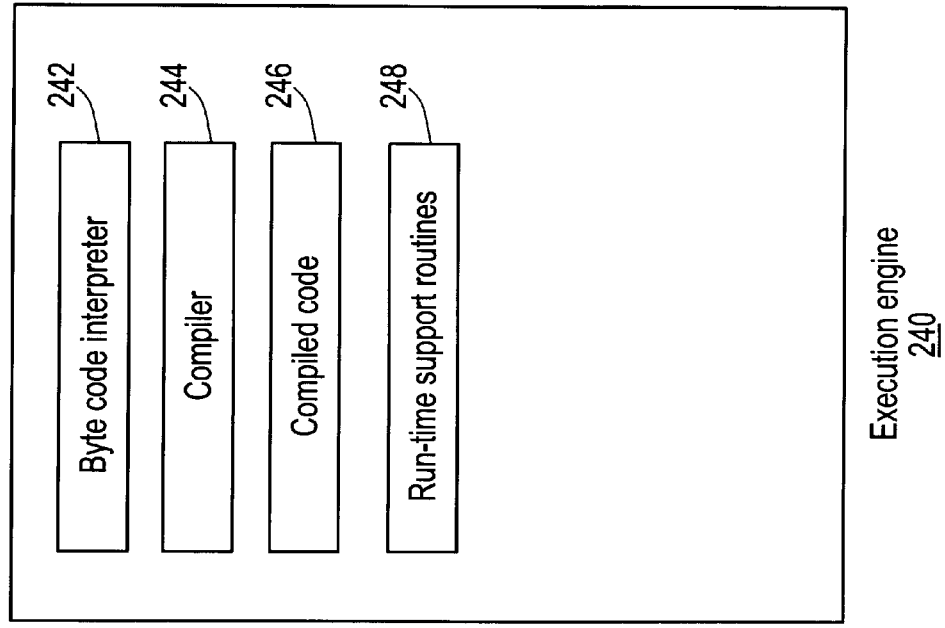
FIG. 14 shows elements within an illustrative execution engine.
Figure 13:
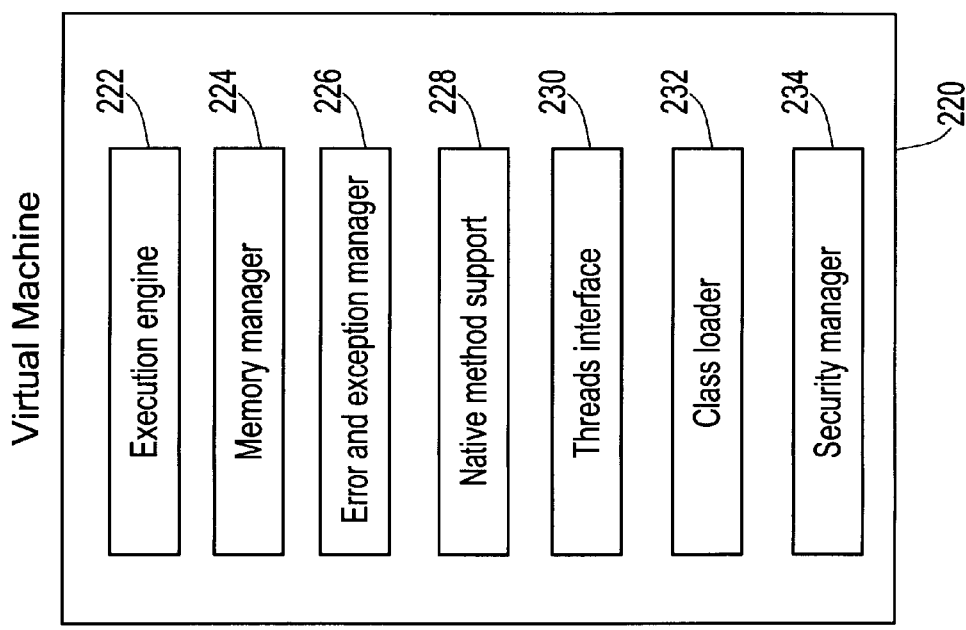
FIG. 13 is a block diagram showing components in a virtual machine.

The read/write barrier of the disclosed system may for example be supported using the execution engine 222 of the virtual machine in FIG. 13, and as further shown in FIG. 14. In one method, the byte code interpreter 242 uses functions in the run time support routines 248 to check for the busy value in variables as they are accessed at execution time. Alternatively, the compiler 244 may insert native code instructions providing the read/write barrier, or equivalent function calls into the run-time support routines 248, into the compiled code 246 prior to execution.

Any impact on performance caused by the disclosed read/write barrier may be lessened by reducing the number of variables on which it is imposed. This can be accomplished in several ways. First, those fields which may hold the busy values may be required to be annotated as being a predetermined kind of variable, for example by the programmer. This may be accomplished using a word such as "volatile" or "synchronized" in connection with the introduction of each such variable, as in its definition. This appoach effectively makes the capability of holding a busy value an explicit property of those variables. The number of variables on which the read/write barrier is imposed is thus reduced to only those variables which are appropriately annotated as having the capability of holding the busy value.

In another technique, no annotation of such variables is required, but their presence is incrementally discovered prior to execution of code in which they are accessed. For example, the execution engine 222 or the class loader 232 of the virtual machine 220 in FIG. 13 may be modified to detect variables which may hold a busy value in a variety of ways. Such detection may for example be accomplished by forming a list of variable names which occur in a predetermined position within the parameters passed to a double compare and swap operation. Detection by the class loader is a conservative approach to forming this list, however, not all classes that are loaded are necessarily executed. In this way the read/write barrier need only be imposed on those variables in the list of variable names. Such a list would be used to perform recompilation of methods as variables that those methods access are found to occur in the predetermined position within the parameters to the DCAS operation.

In another approach, applicable where a complete compiled code image is available prior to execution, the compiler 244 shown in the execution engine 240 of FIG. 13 performs a global static analysis of the compiled code 246, to form a list of which variables are never passed in a predetermined position within the parameters of a double compare and swap operation. Those variables on such a list would thus not be subject to the read/write barrier shown in FIG. 11.

The disclosed system may be extended to provide n-way compare and swap operations. Such operations are useful in many circumstances, including moving an element of a doubly linked list, during which six links must be updated indivisibly, and for performing binary tree rotations. An example of a DCAS extension that simultaneously modifies more variables is the tripleCompareAndSwap shown by the following pseudo code, which must be executed atomically:

```
tripleCompareAndSwap(int *x, int oldxval,
                     int *y, int oldyval,
                     int *z, int oldzval,
                     int newxval, int newyval, int newzval) {
    if (*x != oldxval || *y != oldyval || *z != oldzval)
        return false;
    *x = newxval;
    *y = newyval;
    *z = newzval;
    return true;
}
```

The n-way compare and swap operation is supported by forcing the first n−1 variables to be of reference type, using these variables to hold busy values, and using a sequence of n compare and swap hardware instructions to perform the specified swaps (performing the swap for the nth variable last). If any of the compare and swap instructions fail, the operation is aborted, the old contents of any modified variables are restored, and the operation indicates a failure status. Otherwise, new values are written to the variables and the operation indicates a success status.

While the invention is described through several example embodiments, it will be understood by those of ordinary skill in the art that modification to and variations of the disclosed embodiments may be made without departing from the inventive concepts herein disclosed. Accordingly, the invention should not be viewed as limited except as by the scope and spirit of the appended claims.

What is claimed is:

1. A method for providing a double compare and swap operation, comprising:

executing a first compare and swap operation, wherein said first compare and swap operation determines if a contents of a first variable is equal to an old value for said first variable, and wherein said first compare and swap operation, responsive to determining that said contents of said first variable is equal to said old value for said first variable, writes a busy value to said first variable and indicates success;

executing a second compare and swap operation responsive to said first compare and swap operation indicating success, wherein said second compare and swap operation determines if a contents of by a second variable is equal to an old value for said second variable, and wherein said second compare and swap operation writes a new value for said second variable to said second variable and indicates success responsive to determining that said contents of said second variable is equal to said old value for said second variable;

writing a new value for said first variable to said first variable, responsive to said second compare and swap operation indicating success; and preventing reads and writes on said first variable while said first variable contains said busy value.

2. The method of claim 1, wherein said double compare and swap operation fails if said contents of said first variable is not equal to said old value for said first variable.

3. The method of claim 1, wherein said second compare and swap operation fails if said contents of said second variable does not equal said old value for said second variable.

4. The method of claim 3, wherein said double compare and swap operation fails if said second compare and swap operation fails.

5. The method of claim 4, further comprising writing said old value for said first variable to said first variable responsive to said second compare and swap operation failing.

6. The method of claim 1, wherein said first variable ordinarily holds a word-aligned address.

7. The method of claim 6, wherein said first variable is of a predetermined kind and wherein access to variables of said predetermined kind are prevented if said variable of said predetermined kind contains said busy value.

8. The method of claim 1 further comprising maintaining a name of said variable in a list of variable names, said list of variable names indicating a respective plurality of variables passed to various calls to said double compare and swap operation; and wherein reads and writes to said plurality of variables are prevented if they contain said busy value.

9. The method of claim 7 further comprising performing a global static analysis to determine which variables of said predetermined kind are not used as a parameter to one or more invocations of said double compare and swap operation.

10. The method of claim 7 further comprising performing a global static analysis to determine which variables of said predetermined kind are not used as a predetermined one of said variables passed to one or more invocations of said double compare and swap operation.

11. The method of claim 1, wherein said busy value is non-word aligned reference value.

12. The method of claim 1, wherein said busy value is a value that may not otherwise be stored in said first variable.

13. A system for providing a double compare and swap operation, said system including a computer readable memory having one or more computer instructions stored thereon, said instructions comprising:

program code for executing executing a first compare and swap operation, wherein said first compare and swap operation determines if a contents of a first variable is equal to an old value for said first variable, and wherein said first compare and swap operation, responsive to determining that said contents of said first variable is equal to said old value for said first variable, writes a busy value to said first variable and indicates success;

program code for executing a second compare and swap operation responsive to said first compare and swap operation indicating success, wherein said second compare and swap operation determines if a contents of a second variable is equal to an old value for said second variable, and wherein said second compare and swap operation writes a new value for said second variable to said second variable and indicates success responsive to determining that said contents of said second variable is equal to said old value for said second variable;

program code for writing a new value for said first variable to said first variable, responsive to said second compare and swap operation indicating success; and program code for preventing reads and writes on said first variable while said first variable contains said busy value.

14. The system of claim 13, wherein said double compare and swap operation fails if said contents of said first variable is not equal to said old value for said first variable.

15. The system of claim 13, wherein said second compare and swap operation fails if said contents of said second variable does not equal said old value for said second variable.

16. The system of claim 15, wherein said double compare and swap operation fails if said second compare and swap operation fails.

17. The system of claim 16, further comprising program code for writing said old value for said first variable to said first variable responsive to said second compare and swap operation failing.

18. The system of claim 13, wherein said first variable ordinarily holds a word-aligned address.

19. The system of claim 18, wherein said first variable is of a predetermined kind and wherein access to variables of said predetermined kind are prevented if said variable of said predetermined kind contains said busy value.

20. The system of claim 13 further comprising program code for maintaining a name of said variable in a list of variable names, said list of variable names indicating a respective plurality of variables passed to various calls to said double compare and swap operation; and program code for preventing reads and writes to said plurality of variables while they contain said busy value.

21. The system of claim 19 further comprising program code for performing a global static analysis to determine which variables of said predetermined kind are not used as a parameter to one or more invocations of said double compare and swap operation.

22. The system of claim 19 further comprising program code for performing a global static analysis to determine which variables of said predetermined kind are not used as a predetermined one of said variables passed to one or more invocations of said double compare and swap operation.

23. The system of claim 13, wherein said busy value is non-word aligned reference value.

24. The system of claim 13, wherein said busy value is a value that may not otherwise be stored in said first variable.

25. A computer program product including a computer readable medium, said computer readable medium having a computer program stored thereon, said computer program for providing a double compare and swap operation, said computer program comprising:

program code for executing a first compare and swap operation, wherein said first compare and swap operation determines if a contents of a first variable is equal to an old value for said first variable, and wherein said first compare and swap operation writes a busy value to said first variable and indicates success responsive to determining that said contents of said first variable is equal to said old value for said first variable;

program code for executing a second compare and swap operation responsive to said first compare and swap operation indicating success, wherein said second compare and swap operation determines if a contents of a second variable is equal to an old value for said second variable, and wherein said second compare and swap operation writes a new value for said second variable to said second variable and indicates success responsive to determining that said contents of said second variable is equal to said old value for said second variable;

program code for writing a new value for said first variable to said first variable, responsive to said second compare and swap operation indicating success; and program code for preventing reads and writes on said first variable while said first variable contains said busy value.

26. The computer program product of claim 25, said computer program further comprising:

program code for failing said second compare and swap operation if said contents of said second variable does not equal said old value for said second variable; and program code for writing said old value for said first variable to said first variable responsive to said second compare and swap operation failing.

27. A computer data signal embodied in a carrier wave, said computer data signal including a computer program, said computer program for providing a double compare and swap operation, said computer program comprising:

program code for executing a first compare and swap operation, wherein said first compare and swap operation determines if a contents of a first variable is equal to an old value for said first variable, and wherein said first compare and swap operation writes a busy value to said first variable and indicates success responsive to determining that said contents of said first variable is equal to said old value for said first variable;

program code for executing a second compare and swap operation responsive to said first compare and swap operation indicating success, wherein said second compare and swap operation determines if a contents of a second variable is equal to an old value for said second variable, and wherein said second compare and swap operation writes a new value for said second variable to said second variable and indicates success responsive to determining that said contents of said second variable is equal to said old value for said second variable;

program code for writing a new value for said first variable to said first variable, responsive to said second compare and swap operation indicating success; and program code for preventing reads and writes on said first variable while said first variable contains said busy value.

28. The computer data signal of claim 27, said computer program further comprising:

program code for failing said second compare and swap operation if said contents of said second variable does not equal said old value for said second variable; and program code for writing said old value for said first variable to said first variable responsive to said second compare and swap operation failing.

29. A system for providing a double compare and swap operation, comprising:

means for executing a first compare and swap operation, wherein said first compare and swap operation determines if a contents of a first variable is equal to an old value for said first variable, and wherein said first compare and swap operation writes a busy value to said first variable and indicates success responsive to determining that said contents of said first variable is equal to said old value for said first variable;

means for executing a second compare and swap operation responsive to said first compare and swap operation indicating success, wherein said second compare and swap operation determines if a contents of a second variable is equal to an old value for said second variable, and wherein said second compare and swap operation writes a new value for said second variable to said second variable and indicates success responsive to determining that said contents of said second variable is equal to said old value for said second variable;

means for writing a new value for said first variable to said first variable, responsive to said second compare and swap operation indicating success; and means for preventing reads and writes on said first variable while said first variable contains said busy value.

30. The system of claim 29, further comprising:

means for failing said second compare and swap operation if said contents of said second variable does not equal said old value for said second variable; and means for writing said old value for said first variable to said first variable responsive to said second compare and swap operation failing.

31. A method for providing an n-way compare and swap operation for n shared variables, comprising:

executing a sequence of n−1 compare and swap operations, wherein said sequence of n−1 compare and swap operations determines whether each of n−1 of said n shared variables is equal to a respective one of a set of corresponding n−1 old values, and wherein each of said compare and swap operation writes a busy value to those of said n−1 of said n shared variables that equal said respective one of said set of corresponding n−1 old values;

executing an nth compare and swap operation on an nth of said n variables, responsive to each of said n−1 of said n shared variables being equal to respective ones of said set of corresponding n−1 old values, said nth compare and swap operation comparing a value of said nth of said n variables with a corresponding old value and writing corresponding new value to said nth variable if there is a match;

writing, responsive to said nth compare and swap operation writing said corresponding new value into said nth variable, corresponding new values into said n-1 of said n variables; and preventing reads writes on those of said n variables while they contain said busy value.

32. The method of claim 31, further comprising:

failing one of said n−1 compare and swap operations if a contents of one of said n−1 of said n shared variables is not equal to said respective one of said set of corresponding n−1 old values; and writing at least one of said set of corresponding n−1 old values to at least one of said n−1 of said shared variables in the event that one of said n−1 compare and swap operations fails.

* * * * *

UNITED STATES PATENT AND TRADEMARK OFFICE
CERTIFICATE OF CORRECTION

PATENT NO.     : 6,223,335 B1
DATED          : April 24, 2001
INVENTOR(S)    : Robert S. Cartwright, Jr. et al.

It is certified that error appears in the above-identified patent and that said Letters Patent is hereby corrected as shown below:

<u>Title page,</u>
Item [75], Inventors, "Franklin" should read -- Needham --;

<u>Column 5,</u>
Line 42, "Tl" should read -- $T_1$ --;

<u>Column 6,</u>
Line 33, "the a" should read -- the --;

<u>Column 7,</u>
Line 52, "tc" should read -- to --;

<u>Column 8,</u>
Line 8, "that the that the" should read -- that the --;
Line 23, "provide (" should read -- provided --;
Line 25, "i" should read -- is --;
Line 59, "e" should read -- a --; and
Line 60, "II" should read -- In --.

Signed and Sealed this

Twentieth Day of August, 2002

Attest:

JAMES E. ROGAN
Attesting Officer     Director of the United States Patent and Trademark Office